United States Patent Office 3,285,854
Patented Nov. 15, 1966

3,285,854
LUBRICATING OIL COMPOSITION
Bobby W. Malone, East Alton, Ill., assignor to Shell Oil Company, New York, N.Y., a corporation of Delaware
No Drawing. Filed July 15, 1963, Ser. No. 295,240
2 Claims. (Cl. 252—46.7)

This invention relates to lubricating oil compositions which are highly detergent, stable and also wear and sludge resistant.

It is known that non-ash forming nitrogen-containing polymers such as commercially available copolymers of long-chain alkyl acrylates and a polymerizable compound containing a basic amino group or amido group such as copolymers of long-chain alkyl methacrylates and aminoalkylmethacrylate or vinyl pyrrolidone, respectively, possess good detergent properties, but when such lubricating oil compositions are subjected to extreme temperature and pressure conditions, they lack stability and wear resistant properties. Attempts to improve the stability and antiwear properties of these polymers under various adverse engine operation conditions by modifying their structure has not been too successful.

It has now been discovered that certain non-ash nitrogen-containing detergent polymers can be rendered sludge and wear resistant and their stability greatly improved by addition to lubricating oils containing such non-ash forming detergent polymers, a small amount of an oil-soluble thio bisphenolic compound having the formula

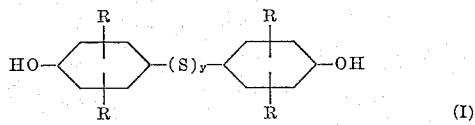

(I)

where the R's are the same or different $C_{1-8}$ alkyl radicals and adjacent to the hydroxyl groups and $y$ is an integer of at least 1 to 4, preferably 1.

The polymeric detergents which function synergistically with inhibitor (I) are derived from nitrogen-containing polymerizable monomers containing primary, secondary or tertiary (the later two are preferred) amino nitrogen, including heterocyclic amino containing substances, having an ethylenically unsaturated polymerizable group. These detergent polymers may be obtained by polymerizing vinyl substituted heterocyclic amino nitrogen-containing substances such as vinyl pyridine, or polyamines prepared by reducing, in the presence of ammonia or primary or secondary amines, with polymerizable unsaturated alcohols, acids or esters such as acrylates and methacrylates of long-chain fatty acids, and the like. The preferred polymeric amino compounds are those containing tertiary amine groups and particularly those containing heterocyclic amino groups such as obtained by copolymerizing a polymerizable heterocyclic nitrogen base compound with a polymerizable unsaturated material free of heterocyclic nitrogen-containing radicals which can be illustrated by: (A) copolymers of stearyl methacrylate, lauryl methacrylate and 2-methyl-5-vinylpyridine (2.3/5/1); and those which contain additional $C_{1-4}$ alkyl methacrylates in the polymer, such as copolymers of stearyl methacrylate, lauryl methacrylate, methyl methacrylate and 2-methyl-5-vinylpyridine and similar copolymers in which the methyl methacrylate is replaced by butyl methacrylate and 2-methyl-5-vinylpyridine is replaced by 5-ethyl-2-vinylpyridine. These vinylpyridine copolymers have a molecular weight (determined by light scattering method) of from about 400,000 to about 850,000. Copolymers of this are specifically prepared and illustrated by the following examples.

EXAMPLE I

A mixture of 2.52 mols of stearyl methacrylate, 5.04 mols of lauryl methacrylate, 0.83 mol of methyl methacrylate and 1 mol of 2-methyl-5-vinylpyridine and 0.2% wt. of alpha,alpha'azodiisobutyronitrile dissolved in a minor amount of acetone for solubility was placed in a reaction vessel and reacted for about 24–48 hours at 65° C. with stirring in a nitrogen atmosphere. The polymer was then dispersed in equal volumes of benzene and thereafter precipitated with 5–10 volumes of a mixture of acetone and methanol. This was repeated and a stearyl methacrylate lauryl methacrylate/methyl methacrylate/2-methyl-5-vinylpyridine polymer having a nitrogen content of 0.06% by weight and a molecular weight in excess of 750,000 was recovered.

Following essentially the procedure of Example I, other polymers are prepared from monomer mixtures in the molar proportions as shown in Table I.

Table I

| Example | SMA | LMA | MMA | BMA | MVP | EVP |
|---|---|---|---|---|---|---|
| II | 2.24 | 4.48 | 1.86 | | 1 | |
| III | 2.24 | 4.48 | | 1.86 | 1 | |
| IV | 2.05 | 3.92 | 2.43 | | 1 | |
| V | 2.05 | 3.92 | | 2.43 | 1 | |
| VI | 1.68 | 3.36 | 3.36 | | 1 | |
| VII | 1.68 | 3.36 | | 3.36 | 1 | |
| VIII | 1.40 | 2.80 | 4.2 | | 1 | |
| IX | 1.40 | 2.80 | | 4.2 | 1 | |
| X | 1.12 | 2.24 | 5.04 | 5.04 | 1 | |
| XI | 1.12 | 2.24 | | | 1 | |
| XII | 2.52 | 5.04 | 0.83 | | | 1 |
| XIII | 2.24 | 4.48 | | 1.86 | | 1 |
| XIV | 2.05 | 3.92 | 2.43 | | | 1 |
| XV | 2.05 | 3.92 | | 2.43 | | 1 |

NOTE.—SMA=Stearyl methacrylate; LMA=Lauryl methacrylate; MMA=Methyl methacrylate; BMA=Butyl methacrylate; MVP=2-methyl-5-vinylpyridine; EVP=5-ethyl-2-vinylpyridine.

Other suitable polymeric amine detergents copolymers of $C_{8-18}$ alkyl acrylates, e.g. lauryl methacrylate and amino alkyl acrylates, e.g. diethylaminoethylmethacrylate. Also suitable are vinyl pyrrolidone-containing polymers or similar copolymers as described in Belgian Patent 550,-442 and British Patent 808,664, and mixtures thereof. Acrylate-vinyl pyrrolidone copolymers are sold by Rohm & Haas under the designations Acryloid 315X or 917 or 966 and are copolymers of N-vinyl pyrrolidone and lauryl methacrylate of varying molecular weights, namely in the range of from about 250,000 to about 650,000 as determined by the light scattering method.

The mole ratio of the nitrogen-containing monomer to the ester or ester mixtures can vary from 1:2 to 1:10, and where dissimilar esters are used they can vary in the mole ratio of 1:4 to 4:1.

Still another class of basic amino nitrogen-containing detergent polymers are polymeric amino-imide-containing detergents such as N-dialkylamino alkyl alkenyl succinimides and illustrated by N-dimethylamino propyl polybutenyl succinimide, or tetraethylene pentamine derivative of polybutenyl succinic anhydride and the like.

Representative copolymers useful in lubricating compositions of this invention also include those identified below, said copolymers having a molecular weight in excess of 50,000 and over 800,000:

lauryl methacrylate/styrene/2-methyl-2-vinylpyridine,
lauryl methacrylate/styrene/2-methyl-5-vinylpyridine,
N-vinyl-3-methyl pyrrolidone/cetyl methacrylate;
N-vinyl pyrrolidone/stearyl methacrylate;
N-vinyl pyrrolidone/stearyl acrylate,
N-vinyl-3,3-dimethyl pyrrolidone/lauryl methacrylate,
N-vinyl pyrrolidone stearyl methacrylate/cetyl methacrylate, N-vinyl-3-methyl pyrrolidone/stearyl methacrylate/lauryl methacrylate and mixture thereof. The molecular weights of the polymer was detergented by the light scattering method.

The thio-bis(dialkyl phenol) compounds can be prepared by means well known in the art. Thus, thio-bis(dialkyl phenol) having the formula

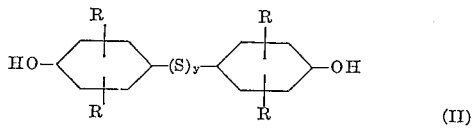

(II)

can be prepared by reacting alkyl phenols with sulfur chloride in the presence of a polar soslvent, e.g. carbon tetrachloride, at a temperature range from room temperature to about 85° C. Such compounds include mono and dithio-bis(3,5-diisopropyl phenol), mono- and dithio-bis(3-methyl-5-tertbutyl phenol), mono- and dithio-bis(3,5-ditertoctyl phenol), mono- and dithio(3,5-ditertbutyl phenol), mono- and dithio(3,5-ditertanyl phenol), mono- and dithio(3-methyl-5-cyclohexyl phenol) and the like.

When desired, additional improvements with respect to oxidation stability and scuffing inhibition can be imparted to the oil compositions containing the polymer salts of this invention by incorporating small amounts of phenolic antioxidants such as alkylphenols, e.g. 2,6-ditertbutyl-4-methylphenol or p,p'-methylene bisphenols such as 4,4'-methylene bis(2,6-ditertbutyl phenol) or arylamines such as phenyl-alpha-naphthylamine; dialkyl sulfides and mixtures thereof, e.g. dibenzyl disulfide, didodecyl sulfide. Also useful are certain organic phosphites, phosphates, phosphonates and their thioderivatives, such as $C_{3-18}$ alkyl phosphites, or phosphonates, e.g. di- and tributyl, octyl, lauryl, stearyl, cyclohexyl, benzyl, cresyl, phenyl phosphites or phosphates, as well as their thioderivatives, $P_2S_5$-terpene reaction products, e.g. $P_2S_5$-pine oil reaction product and alkali metal salts thereof such as a potassium salt of a $P_2S_5$-terpene reaction product, phosphonates such as dibutyl methanephosphonates dibutyl trichloromethanephosphonate, dibutyl monochloromethanephosphonate, dibutyl chlorobenzenephosphonate, and the like. The full ester of pentavalent phosphorus acids such as triphenyl, tricresyl, trilauryl and tristearyl orthophosphates or potassium salt of $P_2S_5$-terpene reaction product are preferred.

Minor amounts of each class of additives are sufficient for a highly effective combination. The detergent polymer and the thio bis(dialkyl phenol) compounds may be used in an amount of about 0.1–15% (1–10%), preferably about 0.25%–5% (.1–1%) by weight, while about 0–2%, preferably about 0.05–1% by weight of the auxiliary additives, e.g. methylene bisphenol or the organic phosphates are highly useful.

The additives of the present invention may be used to improve various hydrocarbon lubricating oils, whether of natural origin or synthetic, especially oils which are substantially paraffinic and/or naphthenic; these may contain substantial proportions of hydrocarbons having aromatic character but the amounts and type of components should be such that the Dean and Davis (Chem. and Met. Eng., vol. 36, 1926, pp. 618–619) viscosity index of the base oil is at least 80, preferably 90 to 150.

The oil may be derived from a highly paraffinic crude, in which case distillation and/or dewaxing may be sufficient to proved a suitable base stock; a minimum of chemical or selective solvent treatment may be used if desired. Mixed-base crudes and even highly aromatic crudes which contain paraffinic hydrocarbons also provide suitable base stocks by well known refining techniques. Usually, these comprise the separation of distillate fractions of suitable boiling range followed by selective solvent extraction with solvents such as furfural, phenol, and the like to provide raffinate fractions which are suitable for further refining by dewaxing or chemical treatment such as sulfuric acid treatment, etc. Thus, it may be a refined hydrocarbon oil obtained from a paraffinic, naphthenic, asphaltic or mixed-base crude, and/or mixtures thereof, such as SAE 5W, 10W, 20W, 20, 30, 40, 50 mineral oils. The hydrocarbon oils may be blends of different mineral oil distillates and bright stock; they may have blended therewith, in minor but compatible proportions, fixed oils, such as castor oil, lard oil and the like and/or with synthetic lubricants, such as polymerized olefins, e.g. polyisobutylene.

The following compositions are representative of the invention.

Composition A: Percent wt.
Ex. I copolymer of lauryl methacrylate/stearyl methacrylate/2 - methyl - 5 - vinylpyridine (M.W. 750,000) _____ 5.0
1,1'-Thio-bis(3-methyl-5-tertbutylphenol) ____ 0.5
Mineral oil (SAE 30) _____ Bal.

Composition B:
Copolymer of N-vinyl pyrrolidone/lauryl methacrylate (M.W.=450,000) _____ 5.0
1,1'-thio-bis(3-methyl-5-tertbutylphenol) _____ 0.5
Mineral oil (10W–30) _____ Bal.

Composition C:
Copolymer of N - vinyl pyrrolidone/lauryl methacrylate (M.W.=450,000) _____ 3
1,1'-thio-bis(3,5-di-tertbutylphenol) _____ 0.5
SAE 30 mineral oil _____ Bal.

Composition D:
Ex. 1 copolymer of lauryl methacrylate/stearyl methacrylate/2 - methyl - 5 - vinylpyridine (M.W. 750,000) _____ 5.2
1,1'-Thio-bis(3-methyl-5-tertbutylphenol) ____ 0.5
Tricresyl phosphate _____ 0.8
Dicresyl phosphate _____ 0.04
SAE 30 mineral oil _____ Bal.

The synergistic aniti-oxidant effects produced by the additive combination of the present invention is shown in Table II wherein the compositions identified therein were subjected to the Dornte oxidation test at 302° F., copper catalysts and the results were as follows.

Table II

[Base=mineral lubricating oil plus detergent polymer corresponding to composition identified and auxiliary additive present, and $A_1$ corresponds to A; $B_1$ to B, etc., except for modification of phenolic compounds indicated below]

Bisphenolic compound: Dornte life (hrs.)
A [1,1'-thio-bis(3-methyl-5-tertbutylphenol)] _ 106
B [1,1'-thio-bis(3-methyl-5-tertbutylphenol)] _ 106
D [1,1'-thio-bis(3-methyl-5-tertbutylphenol)] _ 100
$A_1$ [4,4'-bis(2,6-ditertbutylphenol)] _____ 9.5
$B_1$ [4,4'-bis(2,6-ditertbutylphenol)] _____ 10
$A_2$ [2,2' - methylene bis(4 - methyl - 6 - tertbutylphenol)] _____ 37
$A_3$ [4,4'-methylene bis(6-tertbutyl-O-cresol)] _ 22
$B_3$ [4,4'-methylene bis(6-tertbutyl-O-cresol)] _ 22
$G_1$ [4,4'-bis(2,6-ditertbutylphenol)] _____ 10
$A_4$ (2,6-ditertbutylmethoxy-p-cresol) _____ 9

Compositions A, B, and D, when tested in the 20-hour Lawson engine test (gasket temperature 425° F.) and in the 80-hour COT engine test, gave overall performance rating (10=perfect) of 8–9, whereas corresponding compositions $A_1$, $B_1$, $B_3$, $G_1$ and $A_4$ gave a failure rating of 4–4.8.

Compositions of A, B and D of the present invention when tested in the Oldsmobile scuffing test (AMA–MS Sequence 1—Tested under conditions of report section G–IV of Tech. Committee B of ASTM of D–Z, October 6, 1959, as described in report "Engine Test Sequence for Evaluating Oils for API Service") and each composition gave excellent results, passing the test four times and reducing wear by 60–80% over base oil (SAE 30 mineral lubricating oil). Compositions A and B also left the engine at the end of the test clean with no signs of pitting, sludge or corrosion. However, compositions $A_1$, $A_4$, $B_1$, $B_3$ and $G_1$ failed to pass the Oldsmobile scuffing test.

Lubricating compositions of the present invention can be used in automotive, truck, aeroplane, Caterpillar and diesel engines as well as various industrial equipment.

I claim as my invention:

1. A lubricating oil composition comprising a major amount of mineral lubricating oil and from about 1% to about 10% of an oil-soluble copolymer of 2-methyl-5-vinylpyridine and a mixture of lauryl and stearyl methacrylates having an average molecular weight of from $5 \times 10^4$ to $2.5 \times 10^6$ and from 0.1% to about 1% of 1,1'-thio-bis(3-methyl-5-tertbutylphenol).

2. The composition of claim 1 containing about 0.05–1% each of dicresyl phosphate and tricresyl phosphate.

References Cited by the Examiner

UNITED STATES PATENTS

| | | | |
|---|---|---|---|
| 2,285,855 | 6/1942 | Downing et al. | 252—49.8 |
| 3,029,257 | 4/1962 | Campbell | 252—404 |
| 3,057,926 | 10/1962 | Coffield | 252—48.2 |
| 3,065,275 | 11/1962 | Goddard | 252—404 |
| 3,132,102 | 5/1964 | Coffield | 252—48.2 |
| 3,179,591 | 4/1965 | Herbert | 252—47.5 |

FOREIGN PATENTS

| | | |
|---|---|---|
| 760,554 | 10/1956 | Great Britain. |
| 808,665 | 2/1959 | Great Britain. |

DANIEL E. WYMAN, *Primary Examiner.*

L. G. XIARHOS, *Assistant Examiner.*